(12) United States Patent
Araki

(10) Patent No.: US 8,976,144 B2
(45) Date of Patent: Mar. 10, 2015

(54) TOUCH PANEL AND ELECTRONIC DEVICE EQUIPPED WITH TOUCH PANEL

(75) Inventor: Mikio Araki, Tokyo (JP)

(73) Assignee: Mitsubishi Electric Corporation, Tokyo (JP)

(*) Notice: Subject to any disclaimer, the term of this patent is extended or adjusted under 35 U.S.C. 154(b) by 1041 days.

(21) Appl. No.: 13/062,279

(22) PCT Filed: Sep. 29, 2009

(86) PCT No.: PCT/JP2009/004984
§ 371 (c)(1),
(2), (4) Date: Mar. 4, 2011

(87) PCT Pub. No.: WO2010/064351
PCT Pub. Date: Jun. 10, 2010

(65) Prior Publication Data
US 2011/0148813 A1 Jun. 23, 2011

(30) Foreign Application Priority Data
Dec. 2, 2008 (JP) ................... 2008-307311

(51) Int. Cl.
G06F 3/045 (2006.01)
G06F 1/16 (2006.01)
G06F 3/041 (2006.01)
H01Q 1/24 (2006.01)
H01Q 1/44 (2006.01)

(52) U.S. Cl.
CPC ............. G06F 3/045 (2013.01); G06F 1/1643 (2013.01); G06F 1/1698 (2013.01); G06F 3/0416 (2013.01); H01Q 1/243 (2013.01); H01Q 1/44 (2013.01)
USPC .......................................................... 345/174

(58) Field of Classification Search
CPC ..................................................... G06F 3/0414
USPC ........................... 345/156–184; 343/726–730
See application file for complete search history.

(56) References Cited

U.S. PATENT DOCUMENTS

2004/0105040 A1* 6/2004 Oh et al. ........................ 349/12
2004/0183788 A1* 9/2004 Kurashima et al. ........... 345/173
2009/0153422 A1* 6/2009 Chiang et al. ................. 343/749

FOREIGN PATENT DOCUMENTS

| JP | 2003-280815 A | 10/2003 |
| JP | 2004-234270 A | 8/2004 |
| JP | 2006-48166 A | 2/2006 |
| JP | 2007-60349 A | 3/2007 |
| JP | 2007-235751 A | 9/2007 |

* cited by examiner

Primary Examiner — William Boddie
Assistant Examiner — Carolyn R Edwards
(74) Attorney, Agent, or Firm — Birch, Stewart, Kolasch & Birch, LLP

(57) ABSTRACT

A touch panel 10, which has first and second metal resistive thin films (movable transparent electrode 12 and fixed transparent electrode 13) formed respectively on opposing surfaces of two layers of film or glass (movable glass 11 and fixed glass 14) disposed opposite each other at a predetermined space, is configured such that a predetermined radio frequency signal can be inputted/outputted to/from the movable transparent electrode 12, and ground required for detecting an operation position in the touch panel 10 is connected via an inductive circuit of coils L3, L4 and the like, thereby providing a configuration in which radio waves inputted/outputted to/from the movable transparent electrodes 12 are not grounded in terms of radio frequency.

4 Claims, 2 Drawing Sheets

TOUCH PANEL AND ELECTRONIC DEVICE EQUIPPED WITH TOUCH PANEL

TECHNICAL FIELD

The invention relates to a touch panel and an electronic device equipped with the touch panel.

BACKGROUND ART

A touch panel is a display device in which an input operation can be performed by directly touching a display screen by hand or with a pen. Since the input operation is performed more intuitively that in the case of a keyboard or a mouse, the touch panels have found wide use in vehicle navigation devices, bank ATM (Automatic Teller Machines), and portable electronic devices such as cellular phones, PDA (Personal Digital Assistants), and game devices.

Meanwhile, further miniaturization and improvement in performance of the aforementioned portable electronic devices are required; with the appearance of near-range wireless adapters such as wireless LAN (Local Area Network) and Bluetooth®, for example, electronic devices (electronics) in which an antenna is mounted on a display surface of a LCD (Liquid Crystal Display Device) touch panel and so on have been developed, and a large number of patent applications relating to such devices have been filed.

For example, a touch panel in which the attenuation of emitted electromagnetic waves is small and a sufficient gain can be obtained (see Patent Document 1), a configuration in which an antenna is incorporated in a display device quipped with a touch panel, without loosing the display quality or antenna capability (see Patent Document 2), and a touch panel equipped with an antenna in which a transparent electromotive film fixedly attached to a lower surface of an upper electrode substrate of a touch panel is also used as a ground plate conductor of a microstrip patch (see Patent Document 3) are known.

Patent Document 1: Japanese Patent Application Publication No. 2004-234270
Patent Document 2: Japanese Patent Application Publication No. 2006-48166
Patent Document 3: Japanese Patent Application Publication No. 2003-280815

However, according to the technique disclosed in the aforementioned Patent Document 1, for example, a fixed transparent electrode is grounded via a capacitor to obtain a low potential in terms of radio frequency. Therefore, when the movable transparent electrode and the fixed transparent electrode come into contact with each other during a touch operation of the touch panel, the movable transparent electrode is also grounded via the fixed transparent electrode. The resultant problem is that radio waves are not emitted to thus malfunction as an antenna.

Further, according to the technique disclosed in Patent Document 2, for example, an antenna is formed on a transparent conductive film, but the problem is that the external dimensions are increased because the antenna is formed outside a position detection unit of the touch panel.

Further, according to the technique disclosed in Patent Document 3, for example, an antenna element is formed on either of the lower surface of the upper electrode substrate and the upper surface of the lower electrode substrate of the touch panel. However, the resultant problem, which is similar to that relating to the technique disclosed in Patent Document 1, is that because the lower surface of the upper electrode substrate and the upper surface of the lower electrode substrate are grounded to perform position detection of the touch panel, the antenna function is lost during a touch operation of the touch panel.

DISCLOSURE OF THE INVENTION

The present invention has been created to resolve the above-described problems, and it is an object thereof to provide a touch panel and an electronic device equipped with the touch panel in which the emission characteristic of radio waves during a touch operation of the touch panel is improved, while enabling miniaturization of the touch panel equipped with an antenna.

In order to resolve the above-described problems, a touch panel in accordance with the invention is a touch panel which has first and second transparent electrodes formed respectively on opposing surfaces of two layers of film or glass disposed opposite each other at a predetermined space, and in which a voltage is applied to one of the first and second transparent electrodes and a position of touch operation is detected by a voltage of the other transparent electrode generated in response to the touch operation, the touch panel including: a radio frequency circuit unit that inputs/outputs a predetermined radio frequency signal to/from the first transparent electrode, and a power supply control unit that applies a voltage to the one transparent electrode via a first inductive circuit, guides a voltage of the other transparent electrode generated in response to the touch operation to ground via a second inductive circuit, and suppresses an attenuation of the radio frequency signal inputted/outputted by the radio frequency circuit unit.

In addition, an electronic device in accordance with the invention is equipped with a touch panel which has first and second transparent electrodes formed respectively on opposing surfaces of two layers of film or glass disposed opposite each other at a predetermined space, and in which a voltage is applied to one of the first and second transparent electrodes and a touch operation position is detected by a voltage of the other transparent electrode generated in response to a touch operation, the electronic device including: the touch panel having a radio frequency circuit unit that inputs/outputs a predetermined radio frequency signal to/from the first transparent electrode, and a power supply control unit that applies a voltage to the one transparent electrode via a first inductive circuit, guides a voltage of the other transparent electrode generated in response to the touch operation to ground via a second inductive circuit, and suppresses an attenuation of the radio frequency signal inputted/outputted by the radio frequency circuit unit; a control unit that generates display data and displays the display data on the touch panel and detects an operation input position on the basis of a voltage value read from the touch panel; and a transceiving unit that inputs/outputs the radio frequency signal to/from the touch panel according to control performed by the control unit.

In accordance with the invention, it is possible to provide a touch panel and an electronic device equipped with the touch panel in which the emission characteristic of radio waves during a touch operation of the touch panel is improved, while enabling miniaturization of the touch panel equipped with an antenna.

BEST MODE FOR CARRYING OUT THE INVENTION

A mode for carrying out the invention will be explained below with reference to the appended drawings in order to explain the invention in greater details.

Embodiment 1

Figure 1:
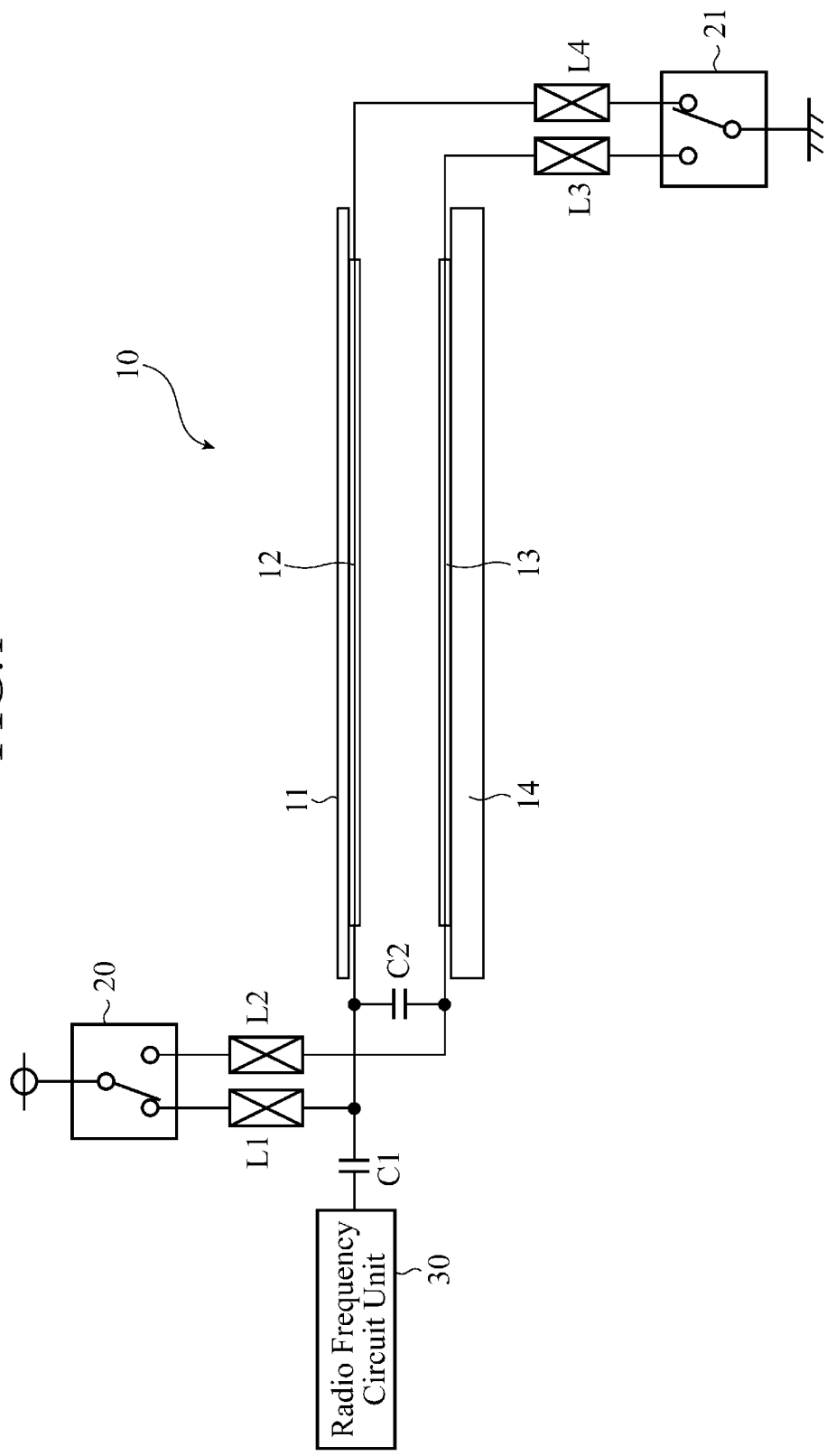
FIG. 1 shows a configuration of a touch panel according to Embodiment 1 of the invention.

FIG. 1 illustrates a structure of a touch panel according to Embodiment 1 of the invention. As shown in FIG. 1, a touch panel 10 according to Embodiment 1 of the invention is constituted by two layers of glass or film (hereinbelow, one will be referred to as a movable glass 11, while the other as a fixed glass 14) disposed opposite each other at a predetermined space by using a spacer (not shown in the figure), a movable transparent electrode 12, and a fixed transparent electrode 13, the electrodes having fixedly attached thereto metal resistive thin films (ITO: Indium Tin Oxide) formed on the respective opposite surfaces of the movable glass 11 and the fixed glass 14.

The touch panel 10 used herein is the so-called resistive pressure-sensitive analog touch panel in which a voltage is applied to one of the movable transparent electrode 12 and fixed transparent electrode 13 and a position of touch operation is detected by a voltage of the other of the fixed transparent electrode 13 and movable transparent electrode 12 generated in response to the touch operation.

Figure 2:
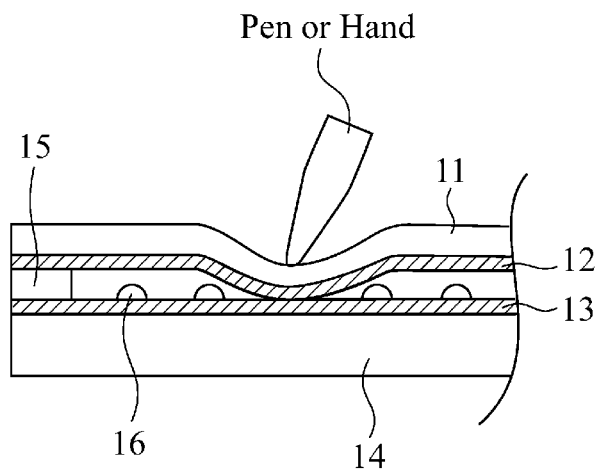
FIG. 2 illustrates a detailed structure and an operation principle of a resistive pressure-sensitive analog touch panel that are used in the touch panel according to Embodiment 1 of the invention.

A detailed structure and operation principle of the above-described resistive pressure-sensitive analog touch panel are illustrated by FIG. 2. As shown in FIG. 2, in the resistive pressure-sensitive analog touch panel, the ITO fixedly attached to the movable transparent electrode 12 and the ITO fixedly attached to the fixed transparent electrode 13 are disposed substantially parallel to each other at a predetermined interval and fixed by a joining member 15.

On the lower surface of the movable transparent electrode 12, X-side electrodes X1, X2, . . . (not depicted), serving to apply a voltage to the ITO are formed on both ends of the fixedly attached ITO that are opposite each other in the X direction, whereas on the upper surface of the fixed transparent electrode 13, Y-side electrodes Y1, Y2, . . . (not depicted), serving to apply a voltage to the ITO are formed on both ends of the fixedly attached ITO that are opposite each other in the Y direction.

Dot spacers 16 are formed from an insulating material such as a resin, and are disposed substantially equidistantly in the form of a matrix on the fixed transparent electrode 13 so as to enable local contact only in a touch portion of the movable transparent electrode 12 and fixed transparent electrode 13.

Where the panel surface is touched by a finger or a special pen in the above-described configuration, the movable transparent electrode 12 corresponding to the operation position is deflected, the movable transparent electrode 12 comes into contact with the fixed transparent electrode 13 arranged opposite thereto, and electric conduction is established between the electrodes, thereby making it possible to detect the touch operation position by measuring a voltage value.

The coordinate values of a touch operation position are generated by the below-described control device. For this purpose, the control device initially applies a voltage to the Y-side electrodes Y1, Y2, . . . , and reads voltage values at X-side electrodes X1, X2, . . . , on the side opposite that of the operation input point. The control device then similarly applies a voltage to the X-side electrodes X1, X2, . . . , and reads voltage values at the Y-side electrodes Y1, Y2, . . . . The voltage values are outputted as XY coordinate values converted by the below-described control device.

Returning to FIG. 1, power supply control units 20, 21 are configured to be provided in each of the aforementioned movable transparent electrode 12 and fixed transparent electrode 13: a voltage is applied thereto via a first inductive circuit of coils L1, L2, and it is guided to the ground via a second inductive circuit of coils L3, L4.

The power supply control units 20, 21 operate in a coordinated manner under the control performed by a control device (not shown in the figure) and switch voltage application to the aforementioned X-side electrodes X1, X2, . . . , and Y-side electrodes Y1, Y2, . . . , for example, at a predetermined time interval of about 10 msec, for instance. In this case, coils L1 and L4 and coils L2 and L3 are ON/OFF controlled in a coordinated manner by the power supply control units 20, 21.

On the other hand, a predetermined radio frequency signal is inputted/outputted by the radio frequency circuit unit 30 to/from the movable transparent electrode 12; at this time the signal is inputted/outputted via a capacitive circuit C1 for blocking a DC component.

It is to be noted that the fixed transparent electrode 13 and movable transparent electrode 12 are configured to be grounded by the power supply control units 20, 21 via the inductive circuit of coils L3, L4, such that the radio frequency signal inputted/outputted by the radio frequency circuit unit 30 is not attenuated in terms of radio frequency by dropping to a ground level (GND level).

As mentioned above, the movable transparent electrode 12 and the fixed transparent electrode 13 are configured to function as ITO generating a difference in potential for detecting a touch operation position and also to function, for example, as a microstrip-shaped antenna.

A capacitive circuit C2 is connected between the movable transparent electrode 12 and fixed transparent electrode 13. As a result, the movable transparent electrode 12 and fixed transparent electrode 13 are maintained at the same potential in terms of radio frequency, to thus reduce variations of impedance caused by touching the touch panel 10.

According to the touch panel of Embodiment 1 of the present invention described hereinabove, as shown in FIG. 1, the touch panel 10 has the movable transparent electrode 12 and fixed transparent electrode 13 having fixedly attached thereto the ITO formed respectively on the opposing surfaces of two layers of film or glass (movable glass 11 and fixed glass 14) disposed opposite each other at a predetermined space, wherein a radio frequency signal can be inputted/outputted to/from the movable transparent electrode 12 and ground (GND) necessary for detecting a position of touch operation in the touch panel 10 is connected via an inductive circuit of the coils L3, L4 and the like, thereby providing a configuration in which radio waves inputted/outputted to/from the movable transparent electrodes 12 are not grounded in terms of radio frequency, and avoiding the attenuation of radio waves during the touch operation of the touch panel 10.

Therefore, even if the touch panel 10 is touched operated when the predetermined radio frequency signal is inputted/outputted to/from the movable transparent electrode 12 by the radio frequency circuit unit 30, the flow of the radio frequency signal to the ground is blocked by the inductive circuit of the coils L3, L4 and the like. As a result, the following event can be avoided: radio waves are not emitted from the movable transparent electrode 12 to thus malfunction as an antenna, due to a contact of the movable transparent electrode 12 with the fixed transparent electrode 13 during a touch operation of the touch panel 10.

A similar configuration is also provided for the fixed transparent electrode 13. In this case, the power supply control units 20, 21 controls by switching the following operations at a time interval of, for example, 10 msec: an operation of applying a voltage to the movable transparent electrode 12 via the inductive circuit of L1 and guiding a voltage of the fixed transparent electrode 13 generated in response to the touch operation to the ground via the movable transparent electrode 12 and the inductive circuit of L4; and an operation of applying a voltage to the fixed transparent electrode 13 via the inductive circuit of L2 and guiding a voltage of the movable transparent electrode 12 generated in response to the touch operation to the ground via the fixed transparent electrode 13 and the inductive circuit of L3.

Therefore, the movable transparent electrode 12 is prevented from being grounded via the fixed transparent electrode 13 even if the movable transparent electrode 12 comes into contact with the fixed transparent electrode 13 during a touch operation of the touch panel 10. As a result, the movable transparent electrode 12 can function as an antenna even during the touch operation of the touch panel 10.

Since the capacitive circuit C2 such as a capacitor is inserted between the movable transparent electrode 12 and fixed transparent electrode 13 and the movable transparent electrode 12 and fixed transparent electrode 13 have the same potential in terms of radio frequency, the impedance variations during a touch operation of the touch panel 10 are reduced. As a result, a stable antenna function can be realized regardless of whether or not the touch panel 10 is touch operated.

As described hereinabove, according to the touch panel 10 of Embodiment 1 of the present invention, the attenuation of the emitted electromagnetic waves is small even during the touch operation of the touch panel 10, and thereby a necessary gain is obtained. Further, the movable transparent electrode 12 also serves as the antenna, and therefore it is possible to improve the emission characteristic of radio waves during the touch operation of the touch panel 10, while enabling the miniaturization of the touch panel 10.

Figure 3:
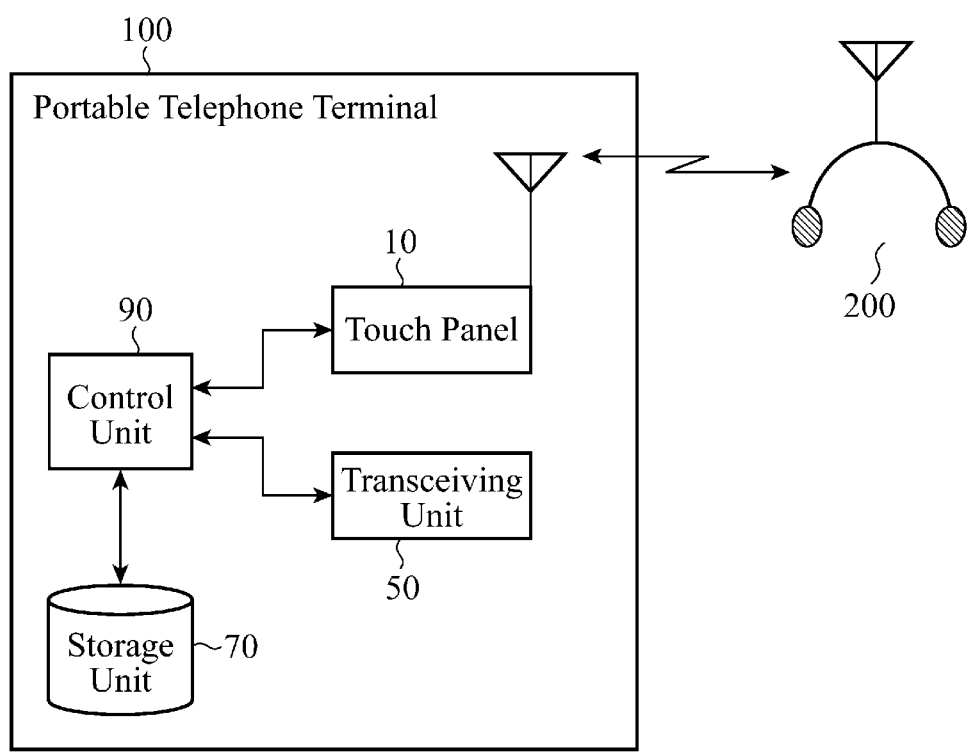
FIG. 3 is a block diagram illustrating the configuration of an electronic device equipped with the touch panel according to Embodiment 1 of the invention.

FIG. 3 is a block diagram illustrating the internal configuration of an electronic device equipped with the touch panel according to Embodiment 1 of the present invention.

In this case, it will be described on the assumption that a portable telephone terminal 100 is employed as the electronic device equipped with the touch panel 10, and the contents such as music are radio transmitted from the portable telephone terminal 100 to headphones 200 and the like, to be audio-visually used.

As shown in FIG. 3, the electronic device (portable telephone terminal 100) equipped with the touch panel according to Embodiment 1 of the present invention is composed of the touch panel 10 having the configuration shown in FIG. 1, a control unit 90 that generates display data and displays the display data on the touch panel 10 and detects an operation input position on the basis of a voltage value read via the touch panel 10, and transceiving unit 50 that inputs/outputs a radio frequency signal to/from the touch panel 10 (radio frequency circuit unit 30) according to the control performed by the control unit 90, and a storage unit 70.

In this case, the portable telephone terminal 100 and headphones 200 are both provided with near-range wireless communication adapter such as Bluetooth® as the transceiving unit 50.

As for the music information transmitted to the headphones 200 in the above-described configuration, the control unit 90 reads music information stored in the storage unit 70, transfers the music information to the transceiving unit 50; the radio frequency signal modulated in the transceiving unit 50 is supplied via the control unit 90 to the radio frequency circuit unit 30 of the touch panel 10 and emitted as a radio wave via the movable transparent electrode 12 of the touch panel 10. As a result, a listener or viewer can audio-visually obtain the music information with the headphones 200.

In such a situation, it is assumed that when the display data such as an operation menu generated by the control unit 90 was displayed on the touch panel 10, the listener performed a menu selection by touching the touch panel 10.

At this time, the control unit 90 converts the operation input position into coordinate values on the basis of the voltage value read out from the touch panel 10 (fixed transparent electrode 13) and then executes the process according to the operation menu.

In this configuration, even if the touch panel 10 is touch operated when the predetermined radio frequency signal is inputted/outputted to/from the movable transparent electrode 12 by the radio frequency circuit unit 30, the radio frequency signal is prevented by the coil L3 from flowing to the ground. As a result, the following event can be avoided: radio waves (music information) are not emitted from the movable transparent electrode 12 to thus malfunction as an antenna, due to a contact of the movable transparent electrode 12 with the fixed transparent electrode 13 during a touch operation of the touch panel 10.

Therefore, the occurrence of sound jumps and the like to be caused where the antenna function is lost during a touch operation of the touch panel 10 can be eliminated and the user can audio-visually use the contents such as music under good reception environments.

The above-described features of the electronic device equipped with the above-described touch panel according to Embodiment 1 of the present invention are explained by considering the portable telephone terminal 100 as an example, but these features are not limited to the portable telephone terminal 100 and can be generally applied to an electronic device using a touch panel as an operation input tool, such as a multimedia device, for example, an AV information device installed on a vehicle.

INDUSTRIAL APPLICABILITY

In the touch panel in accordance with the invention, the emission characteristic of radio waves during a touch operation of the touch panel is improved, while miniaturizing the touch panel also serving as an antenna. Therefore, the features of the present invention is suitable for use in touch panels and electronic devices equipped with a touch panel.

The invention claimed is:

1. A touch panel which comprises first and second electrodes formed respectively on opposing surfaces of film or glass disposed opposite each other at a predetermined space, and in which a voltage is alternately applied from a voltage applying source to one of the first and second electrodes and a position of touch operation is detected by a voltage of the other electrode generated in response to the touch operation, the touch panel comprising:

a radio frequency circuit unit that inputs/outputs a radio frequency signal to the first electrode;

a first inductive circuit connected to a position that is located, on a voltage applying source side of the first electrode, between the first electrode and the voltage applying source while a voltage is being applied to the first electrode;

a second inductive circuit connected to a position that is located, on a voltage applying source side of the second electrode, between the second electrode and the voltage applying source while a voltage is being applied to the second electrode;

a third inductive circuit that is connected to the second electrode at a ground side of the second electrode;

a fourth inductive circuit that is connected to the first electrode at a ground side of the first electrode; and a control unit having first and second ends, and controlling the first end so as to be connected to the fourth or third inductive circuit in response to the alternate application of a voltage to the corresponding first or second electrode, the second end being connected to the ground.

2. The touch panel according to claim 1, further comprising a capacitive circuit connected between the first transparent electrode and the second transparent electrode.

3. An electronic device equipped with a touch panel which comprises first and second electrodes formed respectively on opposing surfaces of film or glass disposed opposite each other at a predetermined space, and in which a voltage is alternately applied from a voltage applying source to one of the first and second electrodes and a position of touch operation is detected by a voltage of the other electrode generated in response to the touch operation, said touch panel comprising:

a radio frequency circuit unit that inputs/outputs a radio frequency signal to the first electrode;

a first inductive circuit connected to a position that is located, on a voltage applying source side of the first electrode, between the first electrode and the voltage applying source while a voltage is being applied to the first electrode;

a second inductive circuit connected to a position that is located, on a voltage applying source side of the second electrode, between the second electrode and the voltage applying source while a voltage is being applied to the second electrode;

a third inductive circuit that is connected to the second electrode at a ground side of the second electrode;

a fourth inductive circuit that is connected to the first electrode at a ground side of the first electrode; and a first control unit having first and second ends, and controlling the first end so as to be connected to the fourth or third inductive circuit in response to the alternate application of a voltage to the corresponding first or second electrode, the second end being connected to the ground;

said electronic device further including:

a second control unit that generates display data and displays the display data on the touch panel and detects a position of operation input on the basis of a voltage value read from the touch panel; and a transceiving unit that inputs/outputs the radio frequency signal to/from the touch panel according to a control performed by the second control unit.

4. The electronic device according to claim 3, further comprising a capacitive circuit connected between the first transparent electrode and the second transparent electrode.

* * * * *